Figure 1:
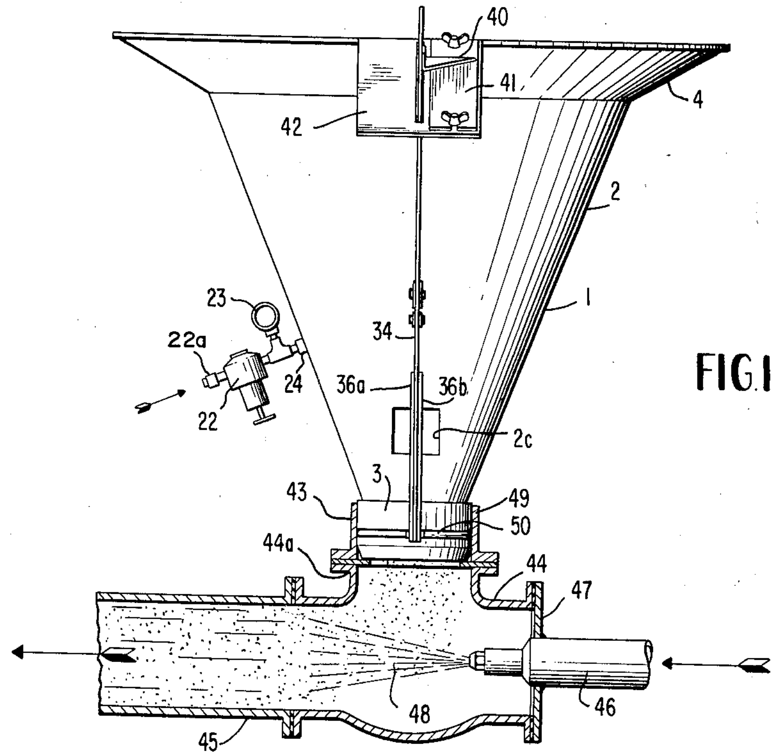

METHOD AND APPARATUS FOR DISPENSING PARTICULATE MATERIAL

Filed Oct. 28, 1964

INVENTOR
JOEL M. STOGNER

BY Burns, Doane, Benedict, Swecker & Mathis
ATTORNEYS

March 1, 1966 J. M. STOGNER 3,237,805
METHOD AND APPARATUS FOR DISPENSING PARTICULATE MATERIAL
Filed Oct. 28, 1964
2 Sheets-Sheet 2
FIG. 3
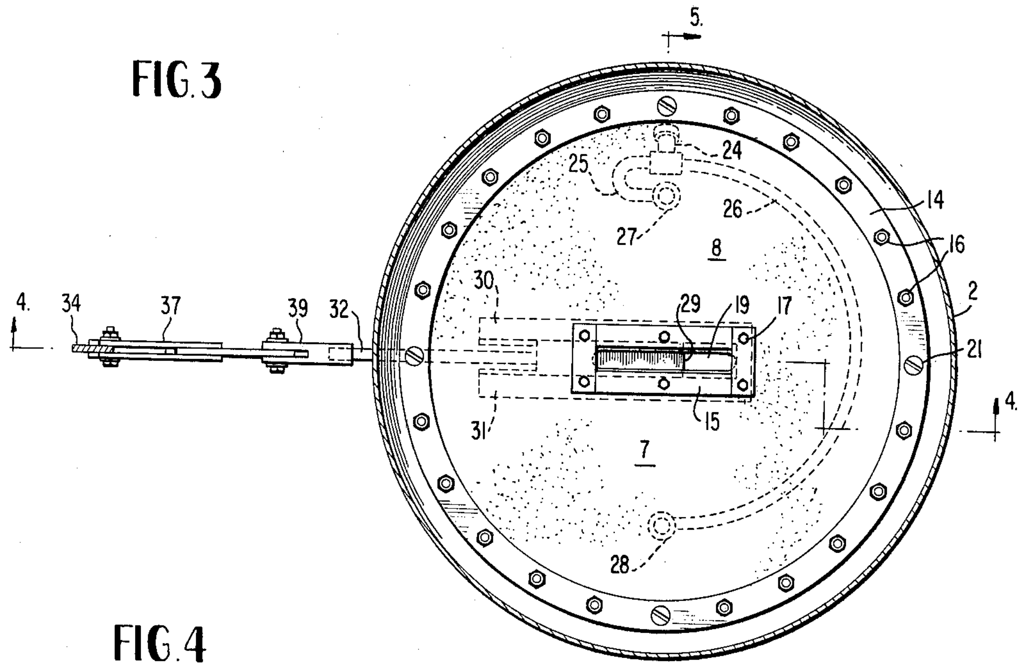
FIG. 4
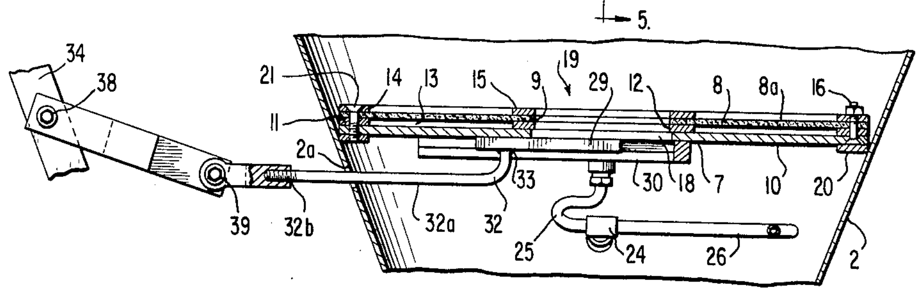
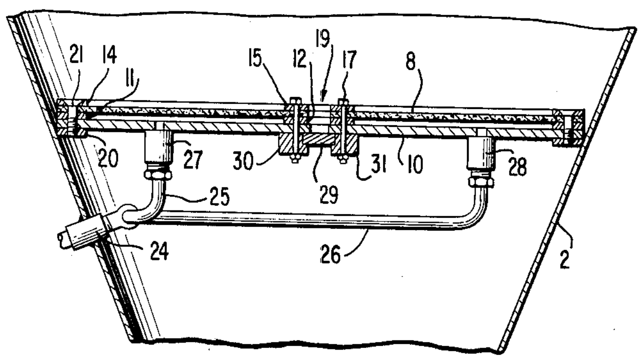
FIG. 5
INVENTOR
JOEL M. STOGNER
BY Burns, Doane, Benedict, Swecker & Mathis
ATTORNEYS

United States Patent Office 3,237,805
Patented Mar. 1, 1966

3,237,805
METHOD AND APPARATUS FOR DISPENSING PARTICULATE MATERIAL

Joel M. Stogner, Duncan, Okla., assignor to Halliburton Company, Duncan, Okla., a corporation of Delaware Filed Oct. 28, 1964, Ser. No. 407,088
7 Claims. (Cl. 222—1)

This invention relates to a method and apparatus for dispensing particulate material at an accurately controlled rate. In particular, the invention relates to a method and apparatus uniquely adapted for metering the flow of finely divided material such as ground bentonite.

In dispensing finely divided or ground particulate material, it is conventional to employ a receptacle having side walls which converge downwardly to terminate in an opening. Even with the discharge facilitating effect of the sloping side walls, it has often been necessary to further facilitate the dispensing of particulate material through the employment of means such as agitators or aerated portions of the sloping walls.

Quite unexpectedly, it has been found that a particulate material may be dispensed with sufficient accuracy for proportioning or blending purposes without resorting to arrangements such as those described above. Through this invention it has been discovered that particulate material may be converged generally toward a horizontal surface having an aperture through which material is to be dispensed at selectively varied rates. Gas such as air is flowed upwardly through this surface during the dispensing operation. With this arrangement, the flow of particulate material through the surface aperture progresses at a consistently predictable rate without the occurrence of aperture clogging or material bridging within the material housing means.

It has also been observed that this dispensing or metering concept is uniquely suited to the discharging of particulate material into a jetlike stream of liquid issuing from a nozzle. In this application of the invention, it might be thought that a vacuum produced through a venturi effect associated with the nozzle might be desirably employed to further facilitate the flow of particulate material through the dispensing outlet. However, it has been unexpectedly observed that such a vacuum will produce undesirable fluctuations in the flow of particulate material.

In appreciation of the foregoing discoveries, it is an object of the invention to provide a method and apparatus by means of which they may be effectively employed in the accurate dispensing or metering of particulate material.

It is a further object of the invention to provide such a method and apparatus which enables the rate of flow of particulate material to be conveniently changed even during the dispensing operation itself.

Yet another object of the invention is to provide such a method and apparatus by means of which particulate material may be dispensed on a sustained basis without clogging a dispensing outlet.

Yet another object of the invention is to provide such a method and apparatus which may be readily adapted to conventional particulate material dispensing structures.

It is likewise an object of the invention to provide such a method and apparatus which enables the convenient repair or replacement of component parts.

It is also an object of the invention to provide such a method and apparatus which effectively eliminates the need for more complex dispensing arrangements such as hoppers having converging or conical wall portions through which particle flow facilitating gas is introduced.

A still further object of the invention is to provide such a method and apparatus which entails relatively nominal expense and yet produces high operational efficiency.

In order to accomplish the foregoing objectives, there is presented through this invention a method of dispensing particulate material which comprises the collecting of such material within containing means and allowing the material to both converge and gravitate downwardly generally toward an apertured, generally horizontal, porous and permeable surface. Gas is flowed upwardly through the permeable surface around a surface aperture. The particulate material flows downwardly through the aperture while the gas is flowing upwardly through the permeable horizontal surface. Barrier means are selectively positioned beneath the surface aperture so as to regulate the rate of flow of particulate material through the aperture.

The apparatus employed in the practice of the invention for accomplishing the aforenoted objectives includes material containing means having downwardly converging wall means. Generally horizontal, permeable surface means extends across an interior portion of the material containing means. Vertical passage means, extending through the surface means, defines an outlet for particulate material disposed within the containing means above the surface means. Means are provided for flowing gas upwardly around the passage means through at least a portion of the surface means. Means are also provided for selectively varying the rate of flow of particulate material through the vertical passage means.

Figure 2:
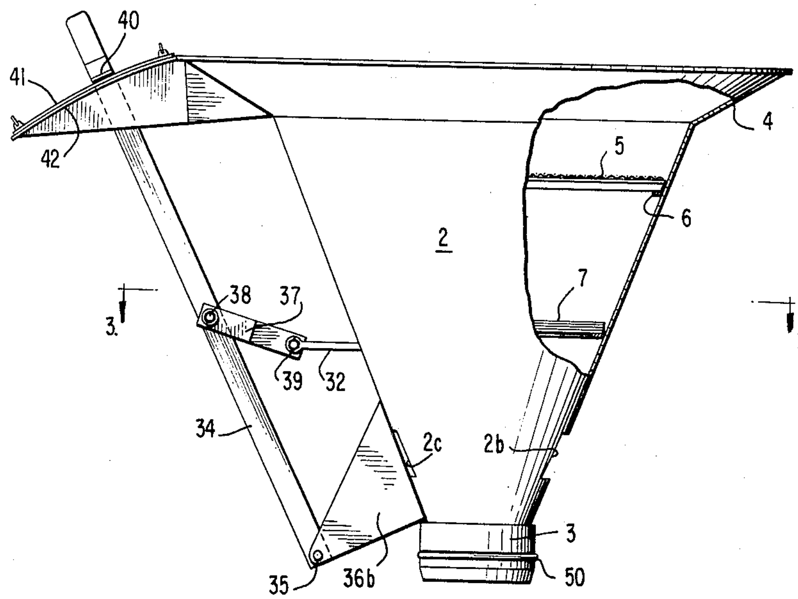

In describing the invention, reference will be made to preferred apparatus and method embodiments illustrated in the appended drawings:

In these drawings:

FIGURE 1 provides a partially sectioned, schematic and elevational view of a preferred apparatus comprising a hopper-like receptacle adapted to regulate the downward flow of particulate, finely divided material into a horizontally flowing, liquid jet;

FIGURE 2 provides a partially sectioned, schematic, and transverse elevational view of the FIGURE 1 assembly;

FIGURE 3 provides an enlarged, horizontal section and schematic view of the FIGURE 1 apparatus as viewed along the section line 3—3 of FIGURE 2;

FIGURE 4 provides a fragmentary, partially sectioned, and vertical elevational view of a portion of the FIGURE 1 apparatus as viewed along the section line 4—4 of FIGURE 3; and FIGURE 5 provides a fragmentary, partially sectioned, and vertical elevational view of a portion of the FIGURE 1 apparatus as viewed along the section line 5—5 of FIGURE 3.

FIGURE 1 illustrates an apparatus embodiment which is specifically adapted for the metering or accurately controlled dispensing of finely divided material such as ground or powdered bentonite which is commercially utilized as an additive in oil well cementing operations.

The apparatus shown in FIGURE 1 comprises a container or receptacle-like housing 1. Housing 1 includes a generally frustoconical, downwardly converging wall 2, a generally cylindrical mounting base 3 and an outwardly flaring, frustoconical upper lip 4.

A horizontally extending screen 5 extends across the upper portion of wall means 2 as shown generally in FIGURE 2. Screen 5 may be removably supported on an annular rim 6 which is secured to the wall 2.

A metering cartridge 7 is spaced beneath screen 5 and provides a central aperture through which the flow of bentonite or other particulate material is accurately controlled.

Metering cartridge 7 comprises an upper surface defining, porous and permeable wall means or plate 8 which may be fabricated from air permeable material such as commercially available, porous and permeable high density polyethylene. The pore size of this material is such as to allow a flow of air or gas therethrough but prevent the flow therethrough of fine or powdered particulate material. The porous and permeable material of the plate 8 may have a permeability on the order of 10 to 15 cubic feet of air per minute per square foot of surface area of plate 8, at a pressure differential across this layer of approximately two inches of water pressure. As illustrated in FIGURES 3 through 5, permeable plate 8 is provided with a generally rectangular, central aperture 9.

Cartridge 7 additionally includes a lower, impermeable wall means or plate 10 spaced beneath plate 8. Plate 10 is of the same shape and configuration as the upper, permeable plate 8. Lower impermeable plate 10 may be fabricated of metallic material such as steel.

As shown in FIGURE 3, plates 8 and 10 each have circularly configured outer edges.

An annular, outer metallic rim 11 and generally rectangular, metallic inner rim means 12 shown in FIGURE 4 serve to vertically space the plates 8 and 10 so as to define a generally annular cavity 13. As will be appreciated, rims 11 and 12 sealingly interconnect the upper plate 8 and the lower plate 10 and are fluid impermeable.

In order to effectively support the inner and outer edges of the plate 8 and hold these edges in tightly sealed relationship against the rim means 11 and 12, an outer annular rim 14 and inner rim means 15 may be provided. As illustrated, outer rim 14 is disposed above and in alignment with the rim 11 and is of the same configuration and size as this latter rim. Generally rectangular rim means 15, which surround the central aperture 9 of plate 8, overlie and are of the same configuration as the rim means 12.

As illustrated, rims 14 and 11 and plates 8 and 10 may be interconnected by conventional threaded fasteners 16. Rim means 15 and 12 and plates 18 and 10 may be interconnected by conventional threaded fastening means 17.

By reference to FIGURES 3, 4 and 5, it will be seen that lower plate 10 includes a central, rectangular aperture 18 aligned with the aperture 9 of the upper wall 8. The edge portions of the plates 8 and 10 encircling the apertures 9 and 18, in conjunction with the rim means 12 and 15, define central, vertically extending passage means 19 for dispensing or discharging particulate material contained within the housing 1 above the permeable upper surface 8a of wall 8.

Metering cartridge 7 is removably supported within the container 1 on an annular rim 20 which encircles and is connected to the inner periphery of the frustoconical wall 2. Cartridge 7 may be detachably secured to the rim 20 by conventional threaded fastening means 21 as schematically shown in FIGURE 4. In this secured position, the upper permeable plate 8 extends horizontally across an intermediate portion of the apparatus so as to define an annular, aerating or gasifying surace encircling the central passage 19. As will be apparent, the cartridge 7, in resting on the supporting rim 20, in essence is connected with the wall 2 such that particulate material within the housing 1 above the surface 8 must flow through the central passage 19 in order to move beneath the cartridge 7.

Pressurized gas such as air is supplied to the annular space 13 by a conventional, pressurized air supplying arrangement as schematically shown in FIGURES 1, 3, 4 and 5. This air supplying arrangement may comprise a conventional air pressure regulator 22, an air pressure gauge 23, and a conduit T-fitting 24 which intersects and is connected to the wall means 2 in a conventional fashion as schematically shown in FIGURES 1 and 3.

Flexible, conventional conduit means 25 and 26 extend from fitting 24 to cartridge inlet fittings 27 and 28 respectively. As shown in FIGURES 3 and 4, conventional fittings 27 and 28 are connected to and intersect lower wall 10 and are symmetrically disposed on opposite sides of central passage means 19. With this arrangement pressurized air supplied from a conventional source through a supply conduit 22a flows under regulated control through the pressure regulator 22 and the meter 23 and through the fitting 24 and flexible supply conduits 25 and 26 to enter the annular space 13 on opposite sides of the central passage means 19. This pressurized air then is diffused and flows vertically upwardly through the permeable plate 8 so as to aerate and fluidize particulate material contained within the housing 1 above the wall 8.

Means are provided for selectively adjusting the flow of particulate material through the central passage means 19. This flow adjusting means comprises a horizontal plate 29 mounted for horizontal sliding movements across the aperture 18. As illustrated in FIGURE 5, the horizontal plate 29 is supported in notched portions of rails 30 and 31 so as to be slidable in surface engagement with edge portions of the lower plate 10 adjacent the central passage 19. Fasteners 17 secure rails 30 and 31 to plate 10.

An operating rod 32 may be connected by conventional means such as welding 33 to the underside of the plate 29 and have a portion 32a which projects generally horizontally away from the plate 29 as shown in FIGURE 4. Rod portion 32a intersects an apertured wall portion 2a so as to terminate on the exterior of the wall 12 as shown.

An operating lever 34 is connected by a conventional pivot joint 35 between conventional spaced bracket plates 36a and 36b which are mounted upon the lower portion of the housing wall 2. A linkage 37 is connected by a conventional pivot joint 38 to a mid portion of operating lever 34 and is connected by a pivot joint 39 to the free end 32b of operating rod 32.

The upper end of operating lever 34 is provided with a transversely extending, flow rate indicating pointer 40. Pointer 40 is disposed adjacent a flow indicating, calibrated plate 41 which is mounted upon a lip 42 extending from rim 4 as schematically shown in FIGURES 1 and 2. Plate 41 is calibrated such that the positioning of the indicator 40 on the plate is indicative of the flow capacity of the central passage 19 as determined by the position of the metering or flow controlling, barrier plate 29.

In a preferred arrangement, the particulate material dispensing apparatus of this invention is employed in conjunction with a jet-type, conveyor and mixing apparatus 43.

As shown in FIGURE 1, apparatus 43 includes a T-type fitting 44 which is connected to a discharge conduit 45, with the flow axes of the conduit 45 and the fitting 44 extending generally horizontally and in vertical alignment beneath the central passage means 19. A jet defining nozzle 46 intersects a wall portion 47 of the T-fitting 43 and is adapted to produce a jet-like formation 48 of pressurized liquid flowing generally along the central, horizontal axis of the fitting 44 and immediately beneath the downwardly gravitating path of particulate material falling from the passage means 19. Pressurized liquid such as water may be supplied to the nozzle 46 by conventional conduit means and pump means not shown.

An annular, collar-like flange 49 may be connected to the upper neck 44a of the T-fitting 44 and define a coupling portion to slidably receive the cylindrical mounting portion 3 of the housing 1. If desired, an O-ring type seal 50 may be mounted on the cylindrical portion 3 so as to sealingly interconnect the cylindrical portion 3 with the interior of the flange 49.

As will be appreciated, the liquid jet 48 defined by the nozzle 46, through a conventional venturi effect, will tend to produce a vacuum in the zone between the jet 48 and the passage 19. Such a vacuum in this zone may be relieved by providing apertures 2b and 2c in the frustoconical wall 2 between the cartridge supporting rim 20 and the cylindrical housing portion 3 as shown in FIGURES 1 and 2. These apertures may be disposed in alignment with the axis of sliding movement of the sliding plate 29.

Under operating conditions, the rate at which powdered particulate material such as bentonite is to be dispensed will be governed by the flow rate of pressurized water issuing from the nozzle 46. The flow indicating plate 41 may thus be calibrated with reference to water flow rates so as to provide indications of settings for the indicator 40 which will provide the desired flow capacity with respect to powdered or particulate material moving through the passage 19.

The flow rate of water through the nozzle 46 may be determined by conventional flow rate metering devices, not shown, and the pointer 40 accordingly adjusted.

With the apparatus set with the plate 29 disposed to allow a desired rate of flow through the outlet 19, particulate material such as bentonite may be deposited onto the sifting screen 5. The powdered material may be deposited from individual bags or from a continuous material feeding mechanism. The screen 5 prevents the passage of undesirably large particles or material masses.

Prior to initiating the dispensing operation, pressurized gas such as air is supplied to the annular space 13 so as to provide an upward, diffused flow of material aerating gas issuing through the plate 8.

With a continuous flow of pressurized gas passing upwardly through the plate 8, particulate material within the apparatus 1 and above the surface 8*a* will converge downwardly and flow evenly and smoothly and at a controlled and consistent rate through the outlet 19.

The powdered material, after passing through the outlet 19, gravitates downwardly to the water jet 48 where it is entrained and flows through the discharge conduit 45 to a desired work site.

By venting the wall 2 between the metering cartridge 7 and the jet 46, pulsations in powder flow which would tend to be caused by a vacuum condition in this zone are effectively avoided. In addition, the disposition of the vents 2*b* and 2*c* allows a vacuum induced air flow downwardly along opposite sides of the stream of material falling from the passage 19. The two downwardly converging air streams may have a desirable effect on the material flow by tending to confine it along the elongate direction of the rectangular passage 19.

Even over sustained periods of powder dispensing, there will be observed a continuously accurate flow of powdered material through the outlet 19 at the desired flow rate.

During operations, and while particulate material is being dispensed, the flow rate of the outlet 19 may be adjusted merely by appropriately manipulating the lever 34 so as to change the position of the flow controlling, barrier plate 29 relative to the central passage 19.

If it should become desirable to remove the metering cartridge 7 for replacement or service purposes, it is merely necessary to remove the fasteners 21, tilt the cartridge 7, and disconnect the flexible conduits 25 and 26 from the coupling 24 or from the couplings 27 and 28.

The freed cartridge 7 may then be removed from the apparatus for replacement or service purposes. As will be appreciated, of course, prior to removing the cartridge 7 the screen 5 will have been removed from its supporting rim 6.

In describing the mode of operation of preferred method and apparatus embodiments, major advantages of the invention have been demonstrated.

A principal advantage resides in the ability of the method and apparatus to accomplish accurate metering or control of particulate material flow on a sustained basis. It has been observed that the accuracy of the system is substantially independent, from a practical standpoint, of the fluctuations in particulate material height within the dispensing hopper which would ordinarily be encountered during a dispensing operation.

Another major advantage of the invention resides in the ability of the rate of flow of particulate material to be selectively varied during the dispensing operation.

Other advantages of the invention include the ability to dispense material on a sustained basis without causing clogging of the variable capacity dispensing outlet and without causing bridging of the material above the horizontal aerating surface.

Not to be overlooked are the advantages inherent in the ability of the metering cartridge to be easily removed from the apparatus for repair or replacement and the unique simplicity with which the metering cartridge may be installed in conventional hopper structures.

It is also significantly advantageous that accurate dispensing of particulate material may be accomplished over a sustained period without the necessity of introducing flow facilitating gas through hopper side wall portions.

An obviously significant advantage of the invention involves the nominal expense of the apparatus.

Those skilled in the dispensing art and familiar with the disclosure of this invention will at once recognize that the invention is not limited to the dispensing of a particular material such as bentonite, but is broadly applicable to the dispensing of finely divided or powdered materials. It will also be apparent that the invention is not limited to use in conjunction with a jet-type mixer as disclosed, but is broadly applicable to a variety of particulate material dispensing operations. It will also be apparent that additions, deletions, substitutions or other modifications may be made with respect to the disclosed method and apparatus embodiments which would fall within the purview of the invention as defined in the appended claims.

I claim:

1. A method of dispensing particulate material at an accurately controlled rate, said method comprising:
   - collecting particulate material within frusto-conical containing means;
   - allowing said particulate material to gravitate downwardly and converge generally toward an apertured, generally horizontal, and permeable surface;
   - flowing gas upwardly through said permeable surface and entirely encircling a surface aperture, with said aperture being disposed coaxially of said frusto-conical containing means;
   - allowing material to flow downwardly through said surface aperture while said gas is flowing upwardly through said permeable, horizontal surface and while maintaining said material exposed to ambient pressure; and
   - selectively positioning barrier means beneath said surface aperture so as to regulate the rate of flow of particulate material through said aperture.

2. A method as described in claim 1 additionally comprising:
   - flowing a jet of pressurized liquid through a space beneath said surface aperture, with said particulate material flowing downwardly through said aperture; and
   - providing communication between said space and the atmosphere surrounding said containing means.

3. An apparatus for dispensing material at an accurately controlled rate, said apparatus comprising:
   - material containing means including downwardly converging, frusto-conical wall means and an upwardly facing, continuously open, material inlet;
   - generally horizontal, permeable surface means extending across an interior portion of said material containing means;
   - vertical passage means disposed coaxially of said frusto-conical wall means, extending through said surface means, and adapted to provide an outlet for particulate material contained within said containing means above said surface means;
   - means for flowing gas upwardly and entirely encircling said passage means through at least a portion of said surface means; and means for selectively varying the rate of flow of particulate material through said vertical passage means.

4. An apparatus for dispensing material at an accurately controlled rate, said apparatus comprising:

material containing means including downwardly converging wall means;

generally horizontal, permeable surface means extending across an interior portion of said material containing means, said surface means comprising centrally apertured, porous and permeable wall means; centrally apertured, impermeable wall means disposed beneath and spaced from said permeable wall means, side wall means connecting the outer edges of said permeable and said impermeable wall means in mutually sealed relationship and connecting the edges of the central apertures of said permeable wall means and of said impermeable wall means in mutually sealed relationship so as to form vertical passage means extending through said surface means and adapted to provide an outlet for particulate material contained within said containing means above said surface means;

annular rim means carried by said converging wall means and adapted to provide a support means upon which said interconnected permeable and impermeable wall means are disposed;

means for flowing gas upwardly around said passage means through at least a portion of said surface means, said means for flowing gas through said porous and permeable surface means comprising conduit means connected with said impermeable wall means and communicating with the space between said permeable and said impermeable wall means and adapted to supply pressurized gas thereto; and means for selectively varying the rate of flow of particulate material through said vertical passage means.

5. An apparatus for dispensing material at an accurately controlled rate, said apparatus comprising:

material containing means including downwardly converging wall means;

generally horizontal, permeable surface means extending across an interior portion of said material containing means;

vertical passage means extending through said surface means and adapted to provide an outlet for particulate material contained within said containing means above said surface means;

means for flowing gas upwardly around said passage means through at least a portion of said surface means;

means for selectively varying the rate of flow of particulate material through said vertical passage means;

generally horizontally extending conduit means connected to said material containing means whereby particulate material gravitating through said passage means falls generally vertically through an apertured upper portion of said conduit means into the interior thereof;

jet defining means adapted to define a jet of pressurized liquid having a flow axis extending generally horizontally through said conduit interior in vertical alignment beneath particulate material gravitating through said passage means; and vent means in said material containing means beneath said passage means adapted to provide communication between the atmosphere surrounding said material containing means and the space between said passage means and said jet defining means.

6. An apparatus for dispensing material at an accurately controlled rate, said apparatus comprising:

material containing means including downwardly converging wall means;

generally horizontal, permeable surface means extending across an interior portion of said material containing means;

vertical passage means extending through said surface means and adapted to provide an outlet for particulate material contained within said containing means above said surface means;

means for flowing gas upwardly around said passage means through at least a portion of said surface means; and means for selectively varying the rate of flow of particulate material through said vertical passage means and including horizontal plate means mounted for horizontal sliding movement across said passage means, an operating rod connected to said plate means and having a portion extending generally horizontally away from said plate means and extending slidably through an apertured portion of said converging wall means, lever means having a lower end pivotally connected with said containing means beneath said rod means, linkage means pivotally connected at one end to an intermediate portion of said lever means and pivotally connected at another end to said rod means, and indicator means carried by an upper portion of said lever means and adapted to indicate the flow capacity of said passage means.

7. An apparatus for dispensing material at an accurately controlled rate, said apparatus comprising:

material containing means including downwardly converging, frusto-conical wall means;

generally horizontal, centrally apertured, porous and permeable wall means extending across an interior portion of said material containing means and having an outer edge of circular configurations adjacent said frusto-conical wall means;

centrally apertured, impermeable wall means disposed beneath and spaced from said permeable wall means;

side wall means connecting the outer edges of said permeable wall means and said impermeable wall means in mutually sealed relationship and connecting the edges of the central apertures of said permeable wall means and said impermeable wall means in mutually sealed relationship;

annular rim means carried by said converging frusto-conical wall means and adapted to provide a support means upon which said interconnected permeable and impermeable wall means are removably supported;

vertical passage means of rectangular, horizontal cross section defined by the interconnected edges of the central apertures of said permeable wall means and said impermeable wall means, extending through said surface means, and adapted to provide a rectangular outlet for particulate material contained within said containing means above said surface means; and screen means mounted on said material containing means above said passage means;

means for flowing gas upwardly around said passage means through at least a portion of said surface means, said means including plural conduit means connected with said impermeable wall means and communicating with the space between said permeable and said impermeable wall means on opposite sides of said passage means and adapted to supply pressurized gas thereto, horizontal plate means mounted for horizontal sliding movement across said passage means in slidable engagement with the underside of said impermeable wall means;

means for selectively adjusting the position of said plate means relative to said passage means, said means including an operating rod connected to said plate means and having a portion extending generally horizontally away from said plate means and extending slidably through an apertured portion of said converging, frusto-conical wall means;

lever means having a lower end pivotally connected with said containing means beneath said rod means;

linkage means pivotally connected at one end to an intermediate portion of said lever means and pivotally connected at another end to said rod means; and indicator means carried by an upper portion of said lever means and adapted to indicate the flow capacity of said passage means;

generally horizontally extending conduit means connected to said material containing means whereby particulate material gravitating through said passage means falls generally vertically through an apertured upper portion of said conduit means into the interior thereof;

jet defining means adapted to define a jet of pressurized liquid having a flow axis extending generally horizontally through said conduit interior in vertical alignment beneath particulate material gravitating through said passage means; and vent means in said frusto-conical wall means beneath said passage means adapted to provide communication between the atmosphere surrounding said material containing means and the space between said passage means and said jet defining means, said vent means including a pair of openings in said frusto-conical wall means disposed in alignment with the axis of sliding movement of said plate means.

References Cited by the Examiner

UNITED STATES PATENTS

| | | | |
|---|---|---|---|
| 2,883,240 | 4/1959 | Hahl et. al. | 302—29 |
| 2,965,268 | 12/1960 | Baunrline | 222—193 |
| 3,202,461 | 8/1965 | Paton | 222—193 X |

LOUIS J. DEMBO, *Primary Examiner.*

STANLEY H. TOLLBERG, *Examiner.*